Sept. 8, 1964  O. V. JONES, JR  3,147,653
STOCK FEEDING APPARATUS
Filed Nov. 25, 1960  3 Sheets-Sheet 1
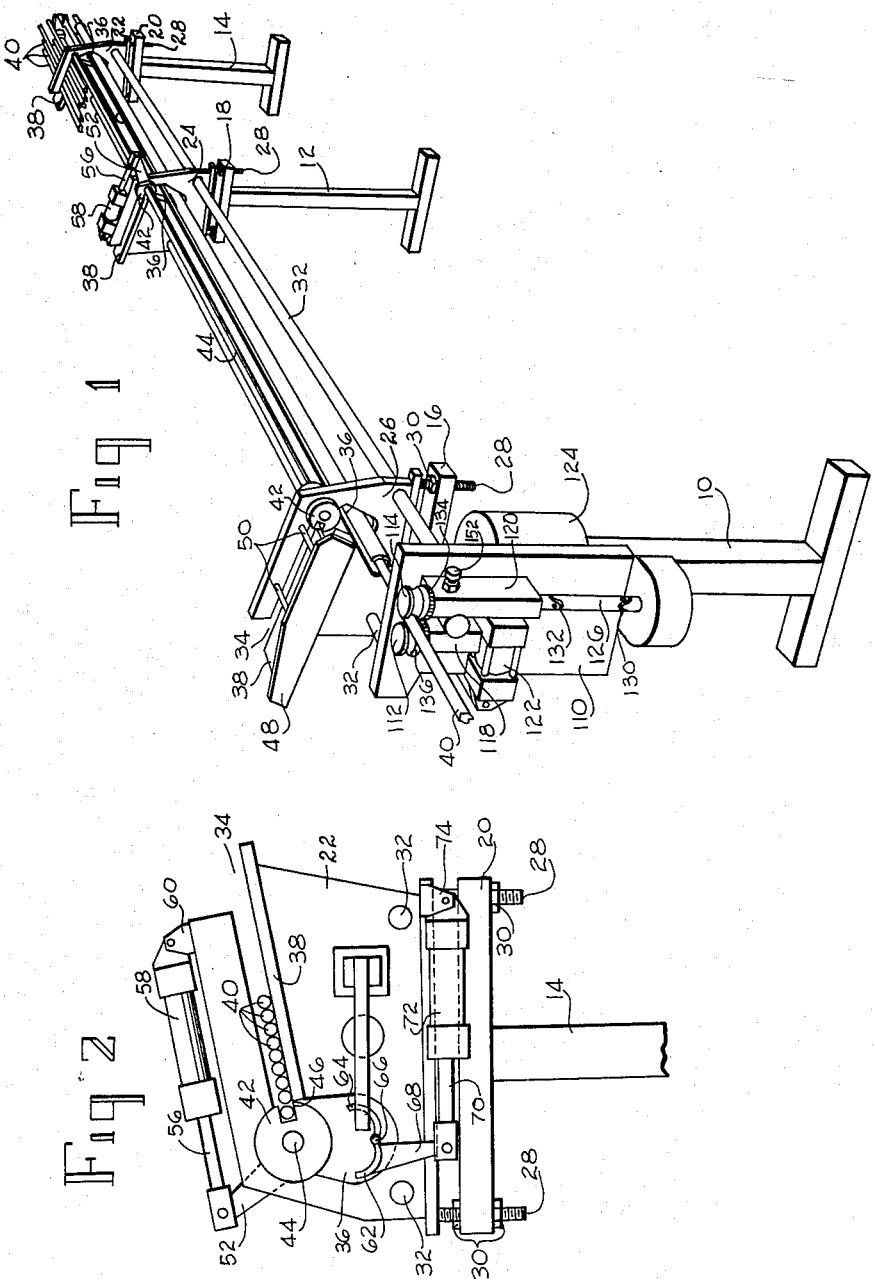
INVENTOR.
OTIS V. JONES JR.
BY
ATTY.

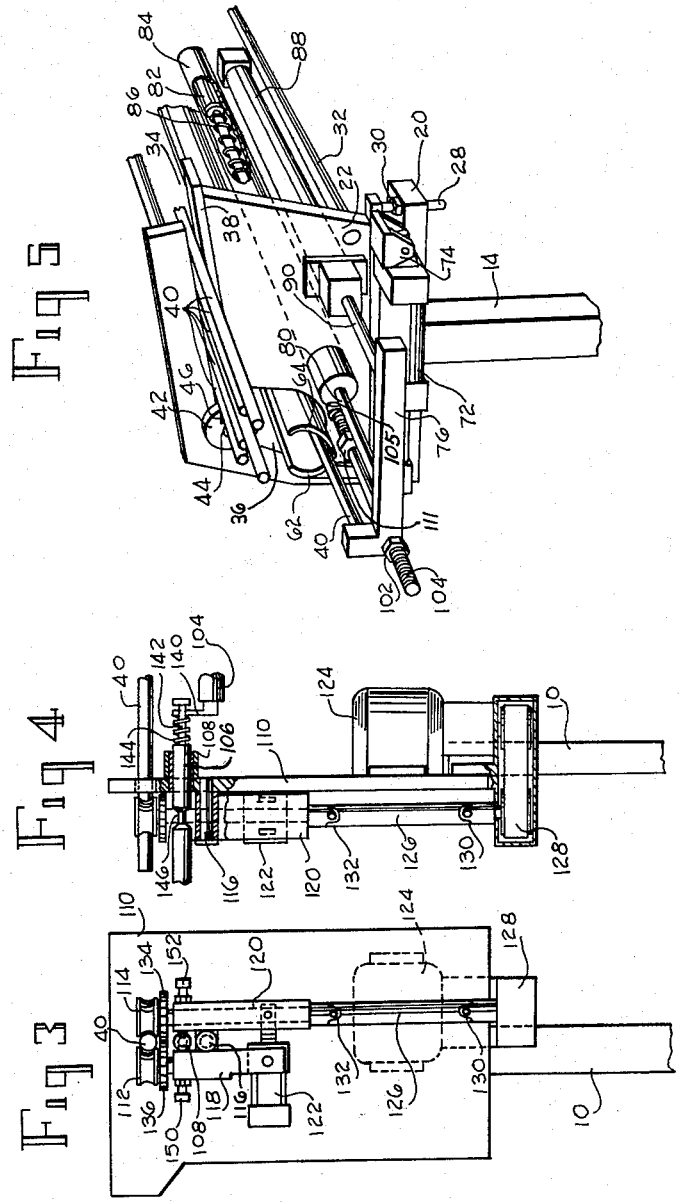

Sept. 8, 1964　　　O. V. JONES, JR　　　3,147,653
STOCK FEEDING APPARATUS
Filed Nov. 25, 1960　　　　　　　　　　　　3 Sheets-Sheet 3
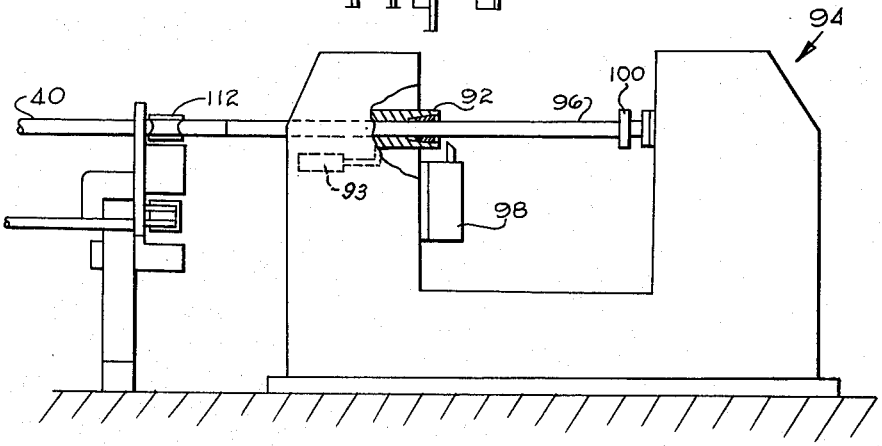
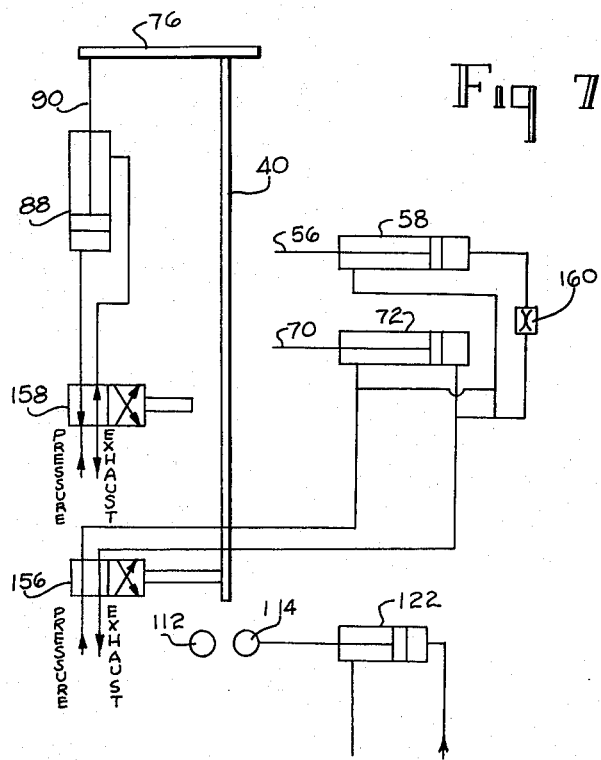
FROM COLLET ACTUATING SYSTEM OF MACHINE
INVENTOR.
OTIS V. JONES JR.
BY
ATTY.

United States Patent Office 3,147,653
Patented Sept. 8, 1964

3,147,653
STOCK FEEDING APPARATUS
Otis V. Jones, Jr., Dearborn, Mich., assignor to Arco-Feed, Incorporated, Detroit, Mich., a corporation of Michigan
Filed Nov. 25, 1960, Ser. No. 71,622
1 Claim. (Cl. 82—2.7)

This invention relates to a device for automatically feeding bar stock to a machine employing one or a plurality of work spindles.

Metal working machines, such as multi-spindle automatics, which form a plurality of identical parts from a length of bar stock, operate at such high rates that automatic devices must be supplied to load them in order to maintain them in constant operation. Such devices generally employ a magazine which is loaded with a number of bars which are fed into the machine one at a time as the previous bars are consumed. Such magazines may be associated with equipment for feeding either one or a plurality of work spindles. The present invention contemplates a machine of this general nature.

These loaders utilize devices for pushing a length of bar stock longitudinally through the collet of the serviced machine until it abuts against a stop beyond the collet so that the proper length of stock protrudes from the collet. The collet then closes about the bar and the machine performs the operation on the protruding length. When the operation is concluded, a cut-off bar separates the finished part from the remaining bar of stock; the collet again opens and another length of bar is pushed against the stop. Loaders have previously been devised in which the longitudinal motion of the bar through the collet is powered by a pair of rollers. Such a feed system is illustrated in my Patent No. 2,811,884 issued November 5, 1957.

In such a roll feed system, when the bar being loaded into the machine becomes so short that it no longer is contacted by the rollers, it must be pushed through the collet by the subsequent bar in the magazine which is fed by the roller system until it abuts the first bar end to end. The system then continues feeding the two bars as if they were one.

Means must be provided for insuring that the point where the two bars abut each other is not gripped by the collet of the machine. If this does occur, the collet will not have a good grip of the part being worked on by the machine and the forces exerted on the bar during the working and cut-off may cause the bar to shift in the collet in such a way as to damage the collet or other parts of the machine.

When all the bars contained in the magazine are fed into the machine are of uniform length, no difficulty is encountered in avoiding the improper disposition of a bar end in the collet. The feeding system is simply adjusted so that a remnant is cut off of the end of each bar which is equal to the difference between the length of the bars and the number of whole parts which may be cut from a bar. However, it is not always convenient to obtain a number of bars of the same length for the feeding of a screw machine and it is often desirable that the machine utilize a series of bars of variable length. Therefore, remnants of varying length must be cut off of each bar in such a system.

The present invention contemplates a stock feeder for bar machines which utilizes feeding means operative to remove remnants of varying lengths from the bars in such a manner as to insure that the junction point between two bars is not gripped by a collet of the machine.

One embodiment of the present invention provides such a feeding system which employs two devices for moving the bar longitudinally through the collet of the serviced machine. When a new bar is first fed from the magazine into the feeding mechanism, it is contacted by a pusher member at its end projecting in the direction away from the machine. This member maintains a uniform pressure on the bar causing it to be pushed through a collet of the serviced machine up against a stop in the machine each time the collet opens. However, the pusher rod has a limited length of travel and after going through that length abuts against another stop. Therefore, the last length of bar fed into the machine by the pusher may not be long enough to reach the stop in the machine but may only be of a length equal to the difference between the integral number of part lengths contained in a bar and the total length of the bar. This remnant is cut off by the machine and may be discarded.

Means are provided for engaging the bar with a roller feed in the feed cycle immediately following the cut-off of this remnant. The roll feed continues to push the bar through the open machine collet until it abuts the stop and since there are an integral number of workpiece lengths contained in the bar after the remnant is cut off, the point of juncture between it and the subsequent bar which pushes it after it passes through the roll feed may be easily controlled so as to prevent it from stopping in the middle of a collet. It should be emphasized that this remnant need not be cut off at the end of the bar but may be cut off at any point in the bar between two integral workpiece lengths.

It is therefore an object of the present invention to provide a device for feeding a sequence of bars which may be of variable length to the spindle or spindles of automatic bar machinery.

Another object is to provide such a feeding device which employs two longitudinal feeding modes in sequence on a single bar.

Another object is to provide such a machine utilizing two longitudinal feeding modes in which the first of such two feeding modes only operates through a limited length which may contain less than an integral number of workpiece lengths.

A still further object is to provide such a device in which a second mode of longitudinal feeding only become operative in the feeding cycle following the cycle in which the first feeding mode has achieved its limit of motion.

Other objects, advantages and applications of the present invention will be made apparent by the following detailed description of one embodiment of the invention. The description makes reference to the accompanying drawings in which:

FIGURE 1 represents a perspective view of an embodiment of the invention as applied to an apparatus for feeding a machine employing a single spindle and collet;

FIGURE 2 represents a cross-sectional view of the apparatus taken along line 2—2 of FIGURE 1;

FIGURE 3 represents an end view of the apparatus of FIGURE 1;

FIGURE 4 represents a limited cross-sectional view taken along lines 4—4 of FIGURE 3;

FIGURE 5 represents a detailed perspective view of the opposite end of the apparatus from that in FIGURE 3;

FIGURE 6 is a schematic view illustrating the relationship of the apparatus to the machine being serviced; and FIGURE 7 is a simplified schematic view of the hydraulic and electrical circuitry of the machine.

The loader is supported above the floor by three vertical pedestals 10, 12 and 14 which respectively terminate at their upper ends in horizontal support bars 16, 18 and 20. The bars 16, 18 and 20, in turn, support three similar plates 22, 24 and 26 by means of screws 28 which project downwardly from the plates at their lower ends and pass through holes in the bars 16, 18 and 20 in which they are supported by upper and lower nuts 30 which allow their height above the floor to be adjusted. The plates 22, 24 and 26 are maintained in alignment by a pair of parallel support bars 32 which are affixed in holes in each of the plates adjacent to their two lower corners.

Each of the plates 22, 24 and 26 has an inclined slot 34 opening to one edge of the plate and communicates with a central aperture 36 near the other edge of the plate. The lower edge of each of the slots 34 is paralleled by a plate 38 which extends perpendicular to plates 22, 24 and 26 along the lower edge of the slots 34. The slots 34 and the plates 38 act as a magazine for a plurality of lengths of bar stock 40 which may be disposed therein in alignment with the connecting bars 32.

The bars are supported at the lower end of the slot 34 by three escapement levers 42, one of which is associated with each of the slots 34. The levers 42 are generally circular and are affixed to a shaft 44 which is journaled in holes in the plates 22, 24 and 26. Each of the plates 44 has a rectangular notch 46 in its edge which is larger than the cross-section of the rods 40.

The bars are initially stacked in a magazine with their ends toward the machine abutting a vertically aligned plate 48 which is supported off the plate 22 by a pair of rods 50. When rods 40 are loaded into the magazine bounded by the slots 44 and the plates 38, one of their ends is abutted against the plate 48. Their other ends extend in the opposite direction for various lengths within a limited range. The escapement levers 42 are normally disposed in the position indicated in FIGURE 2; that is, with their notches 46 receiving the lowest rod 40 in the magazine. The notches 46 on the levers 42 are all in alignment so that for a particular position of the shaft 44 all three levers receive rods in their notches.

When a point in the loader cycle is reached at which another rod is to be loaded into the machine, under conditions which will be subsequently described, the escapement levers 42 are rotated in a clockwise direction as viewed in FIGURE 2 by means of an arm 52 which is fixed to the shaft 44 and pivotably connected at its other end through rod 56 of a fluid actuated cylinder 58. The other end of the cylinder 58 is trunnion mounted to a block 60 supported on the top side of the plate 24. The mechanical arrangement is such that when the cylinder 58 retracts its rod 56, the shaft 44 and the escapement levers 42 are rotated in a clockwise direction. When the cylinder 58 extends its rod, the levers 42 are rotated in a counter-clockwise direction.

A rotation of the levers 42 in a clockwise direction acts to drop the rod 40 contained in the slots 46 into an open set of feed tube halves 62 and 64. At the same time the escapement levers block the further motion of any of the other rods 40. The escapement levers 42 then rerotate into a position wherein their slots 46 are aligned with the slot 34 and the next bar 40 is fed into the slots in readiness for loading into the feed tubes.

The feed tube halves are disposed at the lower end of the central apertures 36 in the plates 22, 24 and 26 and are longitudinally aligned with the other assemblies. The feed tube comprises a pipe of larger internal diameter than the rods 40 split into a fixed section 64 and a swinging section 62 joined by a hinge 66. The swinging section 62 is attached to an arm 68 which has its other end pivotably connected to the rod 70 of a second fluid cylinder 72. That cylinder is also trunnion mounted on a base 74 affixed to the lower end of the plate 26. When the rod 70 of the cylinder 72 is retracted, the movable feed tube half 62 assumes the position indicated in FIGURE 2, wherein the feed tubes are open so as to receive a part dropped from the escapement lever 42. When the rod 70 of the cylinder 72 is extended, the movable half 62 swings about the hinge 66 so as to form a closed tube which surrounds and guides a portion of the rod 40. This closed position is illustrated in FIGURE 5.

As illustrated in FIGURE 5, when a rod 40 is dropped into the feed tube 62 and 64, its end that extends away from the machine being serviced is abutted by a push bar 76. The bar 76 is normally retained in close proximity to the plate 22 by a rod 80 which has one end connected to bar 76 and the other end connected to a piston 82 which moves in a cylinder 84 and is loaded by a spring 86 so as to be normally retracted therein.

The bar 76 may be moved outwardly away from the plate 22 against the loading of the spring 86 and by a fluid cylinder 88 which has its rod 90 connected to the bar 76. When the cylinder 88 extends its rod 90, the bar 76 is moved against the bias of the spring translating the bar away from the plate 22. When the pressure is removed from the rear end of the piston of the cylinder 88, the rod 80 moves the bar 76 toward the plate 22 until it abuts the end of the rod 40. The rod is then pushed toward the serviced machine until it abuts the end of the bar previously fed to the serviced machine.

As may be seen in FIGURE 6, this previous bar extends into a collet 92 of a serviced machine schematically indicated at 94. The collet 92 is opened by a cylinder 93 following each cutting cycle of the machine in order to allow a new section of stock to be fed into the machine. The section of rod 96 which projects beyond the collet is operated on by the machine. When the operations of the machine on this bar section are completed, a cut-off bar 98 separates it from the remaining rod section. At that point the collet 92 opens and allows a further section of bar to move through the collet until it strikes a stop plate 100 on the serviced machine. This motion is initially produced by the force exerted on the end of the bar 40 by the pusher 76 acting under the influence of the spring 86.

When the bar 76 moves away from the plate 22 under the influence of the piston of cylinder 88, it is stopped in its extreme position by a nut 102 which is attached to the threaded extension of a rod 104. This rod 104 passes through a hole in the bar 76 and extends the entire length of the loader. It is journaled in the plate 22 by a bushing 105. At its other end, it attaches to a bar 106 (FIGURE 4) which is journaled in a bushing 108.

The bar 104 may be moved longitudinally a short distance such as two inches under the influence of the bar 76. When the bar 76 is moved away from the plate 22, it strikes the stop nut 102 and moves the bar 104 longitudinally away from the serviced machine. When the bar 76 finishes its stroke in the direction of the machine, it strikes a second stop nut 111 on the bar 104 and moves the bar two inches longitudinally in the direction of the serviced machine.

Referring to FIGURES 3 and 4, it may be seen that the motion of bar 104 is transferred to the bar 106 which slides in the bushing 108. Bushing 108 is retained in a vertically aligned roll support plate 110 which is supported off of the vertical pedestal 10. The plate 110 supports two rolls 112 and 114 about a horizontal pivot point 116. The roll 112 extends rotatably above a support 118 while the roll 114 is rotatably fixed on a support 120. A fluid cylinder 122 has its rod connected to the support 120 and its cylinder end connected to the support 118 below the horizontal pivot point 116. The physical arrangement is such that when the cylinder 122 retracts its rod, the ends of the supports 118 and 120 below pivot 16 are moved toward one another; therefore, the rolls 112 and 114 are moved away from one another. Conversely, when the cylinder 122 extends its rods, the lower ends of the blocks 118 and 120 move away from one another and the rolls 112 and 114 move toward one another. Normally, the motion of the rolls 112 and 114 toward one another will be limited by a bar 40 which extends out of the ends of the guide tubes 62 and 64 and through the rolls.

The rolls are driven through an electric motor 124 which connects to a drive shaft 126 through a cog-belt 128. The drive shaft 126 has a pair of flexible connections 130 and 132 along its length which allow it to reciprocate as the rolls 112 and 114 are moved toward and away from one another by the cylinder 122. The drive shaft 126 terminates in the roll 114 and a gear 134 affixed to the shaft immediately below the roll drives a mating gear 136 which is similarly affixed to the shaft of the gear 112 and causes the two to rotate in opposed senses.

In FIGURE 4 it will be noted that the connection between the rod 104 and the bar 106 takes the form of a vertically upward extension 140 having a central passage through its upper end which is journaled about a narrowed section 142 forming the end of the bar 106. A spring 144 which is wrapped about the narrowed section 142 normally biases the bar 106 in a left direction with respect to the rod 104 as viewed in FIGURE 4. However, if the bar 106 is restrained against movement in a left direction, it is possible for the rod 104 to move in a left direction against the pressure of the spring 144 without moving the bar 106.

The bar 106 has a thinned section 146 near its left end as viewed in FIGURE 4. This section extends between the roller support blocks 118 and 120. When the bar 106 is in the position illustrated in FIGURE 4, its thinned section 146 is abutted on opposite sides by two adjustment screws 150 and 152 which are respectively set in the blocks 118 and 120. These screws are fixed to project from blocks 118 and 120 to an extension which will allow the rolls 112 and 114 to come together on a bar when the thinned section 146 is in the position shown in FIGURE 4. However, when the bar 106 is moved to the right as viewed in FIGURE 4, or away from the direction of the serviced machine as a result of the bar 76 pulling the bar 104 in that direction, a thicker section of the bar 106 is projected between the stop screws 150 and 152. This prevents the rolls 112 and 114 from coming together in driving position on a bar 40 at such time as the cylinder 122 extends its rod so as to move the rolls 112 and 114 toward one another.

Similarly when the bar 104 is moved to the left as viewed in FIGURE 4 or toward the serviced machine as the result of the bar 76 impacting the set nut 110 on its return toward the plate 22, the bar 106 is not free to move toward the serviced machine if the cylinder 122 has its rod extended so as to press the set screws 150 and 152 against the bar. In this event the bar 104 moves along the narrowed section 142 of the bar 106 against the force of the spring 144. Thereby a force is imposed on the bar 106 which tends to move it toward the left and which does move the bar when the cylinder 122 next retracts its rod so as to remove the pressure of the set screws 150 and 152 from the bar. The bar then again assumes the position shown in FIGURE 4 wherein the thinned section 146 is adjacent to the set screws 150 and 152 so that the rolls may engage a bar 40.

FIGURE 7 is a simplified schematic diagram of the fluid circuitry of the machine. In addition to the components which have previously been described, it includes a four-way hydraulic cam valve 156 which is positioned so as to sense the absence or presence of a section of bar stock 40 in the guide tube at a point in line with the bar stop 48. A second hydraulic cam valve 158 is not disclosed in the structural drawings and has its cam actuated by the opening of the split guide tubes 62 and 64.

*Operation*

The cycle of the machine will be arbitrarily assumed to begin when the trailing end of the section of bar stock 40 being fed by the device passes the cam of the valve 156 so that the valve is shifted. When this occurs, fluid is fed from a hydraulic power supply through the valve to the rod ends of the cylinders 58 and 72. Cylinder 58 retracts its rod 56 thereby causing the escapement plate 42 to be rotated in a clockwise direction feeding the next section of bar stock 40 into the split tube section 62 and 64. Previously the cylinder 72 has retracted its rod 70 causing the split tube sections to open.

A flow control valve 160 in the line between the cylinder 58 and 72 insures that the split tube section will be open before the escapement plate drops a bar. The opening of the split tube guide section 62 and 64 causes the cam in valve 158 to be actuated, switching that valve and transmitting fluid pressure to the piston end of the cylinder 88. This cylinder extends its rod 90 moving the bar 76 away from the plate 22. The presence of a new bar in the feed tube then resets the cam of the valve 156 causing the escapement lever cylinder 58 to return to position and causing the split tube cylinder 72 to close. This releases pressure in the cam of valve 158 and the spring 86 brings the bar 76 against the trailing end of the rod 40.

The motion of the bar 76 away from the plate 22 causes the bar 104 to be shifted away from the serviced machine. At its other end, this causes the bar 106 to be shifted so that the thinned section 146 is no longer adjacent to the stop screws 150 and 152 but rather a thickened section is disposed therein.

The spring 86 now continues to feed the bar 40 toward the serviced machine each time the collet 92 of that machine opens. This feeding at first pushes the previous bar through the collet until it hits the stop 100. When the previous bar is exhausted, the new bar is fed through the collet.

This action continues until the bar 76 reaches the end of its travel. During this time the cylinder 122 has energized its rod each time the collet 92 opens under the control of hydraulic circuitry in the serviced machine. However, the rolls 112 and 114 have not been able to close over the bar 40 because of interference caused by the thickened section of the bar 106 and the rolls have spun without affecting the motion of the tubing.

When the bar 76 reaches the end of its travel, it strikes the stop nut 111 and moves the bar 104 two inches in the direction of the serviced machine. The other end of the bar 104 therefore pressures the bar 106 to move toward the left. However, since this action occurs while the rod of the cylinder 122 is extended, as it is during a feeding action, the bar 106 is captured between the set screws 150 and 152 and cannot move to the left under the pressure of the spring 144 until the cylinder 122 retracts its rod. When the collet 92 again closes after a period of time controlled by the serviced machine, the cylinder 122 retracts its rod and moves the rolls 112 and 114 apart. This frees the bar 106 and it then moves to the left so that the thinned section 146 is adjacent to the set screws 150 and 152. Then, in the next feeding cycle, the rolls 112 and 114 come together to engage the bar 40 and rotate so as to feed it through the collet 92 up to the stop 100. However, because of the action of the bar 106, this roll feeding does not begin immediately upon the bar 76 reaching its end point of motion but rather begins in the next feeding cycle thereafter as determined by the opening of the collet 92. Therefore, during the feed period when the bar 76 reaches the end point of motion, a section of bar which is shorter than normal is fed to the serviced machine. This is true unless the bar 76 reaches its end point of motion at the same instant that the extreme end of the bar reaches the stop 100, which will only occur if there are an integral number of part lengths in the bar being fed. Otherwise, and normally, a section of bar will be fed into the collet 92 which is not sufficient to reach the stop 100. This section of bar will be later cut off and discarded. In the next feed cycle, the feed rolls will feed the part as long as the collet 92 is open which is more than sufficient to cause the end of the bar to reach the stop 100. Any rotation of the rolls after the stop 100 is reached causes the rolls to slide over the bar.

The distance from the end point of motion of the bar 76 to the stop 100 is controlled so that an integral number of part lengths exists between these two points. Therefore, following the initiation of the roll feed action, an integral number of parts will be cut off the remaining bar. Since this occurs, control is maintained over the abutting point between a bar that is being pushed into the serviced machine and the bar that is pushing it. It is, therefore, possible to set the distances such that this junction point never is halted in the middle of the collet so that damage might be caused to the collet by pressures exerted on the bar. The inventive concept is equally applicable to machines which feed a machine employing a plurality of spindles. While the application to such a machine is not illustrated, it is apparent that a push bar of the type illustrated at 76 in the preferred embodiment would be necessary for each spindle to be fed on the machine to be serviced. A single cylinder could load these bars against their individual spring biasing means; then when a spindle, and its associated bar, came into feed position, the push rod associated with that bar would move it upon the opening of the spindle. The theory in operation of such a machine would otherwise be identical to the single spindle embodiment.

It should be understood that the invention is not to be limited by the specific apparatus illustrated but is rather to be defined by the following claim.

Having thus described my invention, I claim:

A device for feeding a plurality of bars of stock to a machine having a collet, means for periodically opening the collet to receive stock therein, and stop means for such stock as it is fed through said collet, comprising: a magazine adapted to retain a plurality of bars of stock in a direction parallel to the axis of said collet; stock guide means adapted to receive a bar of stock from said magazine and to support said bar coaxially with the collet of said machine; pusher means adapted for movement in a direction parallel to the axis of said collet and having means for moving it in a direction away from said machine as a bar of stock is moved from said magazine to said stock guide means and then to move it in the direction of the serviced machine so as to provide a force on the bar in said stock guide means in the direction of said serviced machine, said pusher means having a limited travel in the direction of said machine; a pair of feed rolls disposed on opposed sides of a bar retained in said stock guide means, operative to provide a longitudinal force on said bar in the direction of said machine when engaged; means for engaging said feed rolls at such time as the collet of said machine is open; a stop rod operative to prevent engagement of said feed rolls when it is moved in a direction away from said machine; and means for moving said stop rod away from said machine when said pusher is moved away from said machine and to move said stop rod toward said serviced machine so as to allow said feed rolls to engage when said pusher bar reaches the limit of its travel in the direction of the machine.

References Cited in the file of this patent
UNITED STATES PATENTS

| | | |
|---|---|---|
| 1,065,620 | Muller | June 24, 1913 |
| 2,159,398 | Montgomery et al. | May 23, 1939 |
| 2,320,039 | Jobert | May 25, 1943 |
| 2,595,522 | Harney | May 6, 1952 |
| 2,739,425 | Pragst | Mar. 27, 1956 |
| 2,742,656 | Fischer | Apr. 24, 1956 |
| 2,811,884 | Jones | Nov. 5, 1957 |